(12) United States Patent
Chen et al.

(10) Patent No.: US 8,942,159 B2
(45) Date of Patent: Jan. 27, 2015

(54) TERMINAL IN DIGITAL MOBILE RADIO RELAY SYSTEM, TRANSMISSION POWER REGULATION METHOD AND SYSTEM THEREOF

(75) Inventors: Mingjun Chen, Shenzhen (CN); Chia han siong Samuel, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 245 days.

(21) Appl. No.: 13/808,405

(22) PCT Filed: Jul. 5, 2010

(86) PCT No.: PCT/CN2010/074977
§ 371 (c)(1),
(2), (4) Date: Jan. 10, 2013

(87) PCT Pub. No.: WO2012/003618
PCT Pub. Date: Jan. 12, 2012

(65) Prior Publication Data
US 2013/0100878 A1    Apr. 25, 2013

(51) Int. Cl.
*H04B 7/14*      (2006.01)
*H04W 52/04*    (2009.01)
(Continued)

(52) U.S. Cl.
CPC .......... *H04W 52/04* (2013.01); *H04W 52/0245* (2013.01); *H04W 52/46* (2013.01);
(Continued)

(58) Field of Classification Search
CPC ............ H04W 52/04; H04W 52/0245; H04W 52/242; H04W 52/46; H04W 52/287; H04W 88/04; H04W 52/241; H04W 52/08; H04W 52/10; H04W 84/08; H04W 76/005; H04W 4/10; H04W 76/02; H04W 74/0808; H04W 72/0446
USPC .................................. 370/315, 311, 252, 254
See application file for complete search history.

(56) References Cited

U.S. PATENT DOCUMENTS 7,970,427 B2 * 6/2011 Agahi et al. ................... 455/522
8,068,453 B2 * 11/2011 Holtzman et al. ............. 370/329

(Continued)

FOREIGN PATENT DOCUMENTS

CN        1431791 A      7/2003
CN        101114848 A    1/2008

(Continued)

OTHER PUBLICATIONS

International Search Report dated Mar. 25, 2011 from corresponding International Application No. PCT/CN2010/074977.

(Continued)

*Primary Examiner* — Brian O'Connor
(74) *Attorney, Agent, or Firm* — Wolf, Greenfield & Sacks, P.C.

(57) ABSTRACT

A terminal in a digital mobile radio relay system, a transmission power regulation method and a system thereof are provided. The method includes that an idle frame sent from a relay station is received, the idle frame carries transmission power information of the relay station (201); the transmission power of the relay station is obtained according to the information in the idle frame (202); after a transmission state is entered, data is transmitted in assigned transmission time slots (203); a signal of the relay station is received via a reversal channel and a strength value of the received signal is calculated (204); when data transmission is required to be continued, the transmission power of a next frame is determined based on the transmission power of the relay station and the strength value of the received signal (206); according to the determined transmission power of the next frame, the data of next frame is transmitted in assigned transmission time slots.

15 Claims, 3 Drawing Sheets

(51) Int. Cl.
*H04W 52/02* (2009.01)
*H04W 52/46* (2009.01)
*H04W 52/22* (2009.01)
*H04W 52/24* (2009.01)
*H04W 52/28* (2009.01)
*H04B 17/00* (2006.01)

(52) U.S. Cl.
CPC ........... *H04W52/228* (2013.01); *H04W 52/242* (2013.01); *H04W 52/245* (2013.01); *H04W 52/287* (2013.01); *H04B 17/0057* (2013.01)
USPC ............ 370/315; 370/311; 370/252; 370/254

(56) References Cited

U.S. PATENT DOCUMENTS

| | | | |
|---|---|---|---|
| 8,150,438 B2* | 4/2012 | Bohn et al. | 455/518 |
| 8,270,908 B2* | 9/2012 | Wang et al. | 455/69 |
| 8,290,460 B2* | 10/2012 | Hoepfner | 455/226.2 |
| 8,400,977 B2* | 3/2013 | Ryu | 370/330 |
| 8,503,409 B2* | 8/2013 | Bohn et al. | 370/337 |
| 8,521,158 B2* | 8/2013 | Karpoor et al. | 455/432.1 |
| 8,543,065 B2* | 9/2013 | Karpoor et al. | 455/67.11 |
| 8,626,140 B2* | 1/2014 | Cordova Val et al. | 455/418 |
| 8,660,111 B2* | 2/2014 | Wiatrowski et al. | 370/350 |
| 8,830,863 B2* | 9/2014 | Novak et al. | 370/252 |
| 2007/0135059 A1 | 6/2007 | Yomo et al. | |
| 2008/0219214 A1 | 9/2008 | Chen et al. | |
| 2009/0286471 A1 | 11/2009 | Ma et al. | |
| 2009/0290526 A1 | 11/2009 | Gainey et al. | |
| 2010/0069110 A1 | 3/2010 | Lee et al. | |
| 2010/0086092 A1* | 4/2010 | Wiatrowski et al. | 375/362 |

FOREIGN PATENT DOCUMENTS

| | | |
|---|---|---|
| CN | 101192871 A | 6/2008 |
| CN | 101414857 A | 4/2009 |
| CN | 101754337 A | 6/2010 |
| WO | WO 2004059874 A1 | 7/2004 |
| WO | WO 2005099156 A1 | 10/2005 |

OTHER PUBLICATIONS

European Search Report dated Aug. 30, 2013 from corresponding European Application No. 10854278.

* cited by examiner

| power value (8bit) | MFID (8bit) |
| --- | --- |
| CRC (16bit) | |
| Pseudo code (64bit) | |

TERMINAL IN DIGITAL MOBILE RADIO RELAY SYSTEM, TRANSMISSION POWER REGULATION METHOD AND SYSTEM THEREOF

FIELD OF THE INVENTION

The invention relates to the technical field of mobile communication, and particularly to a terminal in a digital mobile radio relay system, and a method and system for adjusting transmission power thereof.

BACKGROUND OF THE INVENTION

The radio interphone is a professional wireless communication tool in the mobile communication, and is also a consumer tool with characteristics of the consumer product which can satisfy the requirements of user's daily life. Due to its instant communication, economy and practicality, lower cost, convenient usage and no communication fee, the radio interphone is widely used in various fields, such as civil field, military field and emergency process. In terms of design technique, the radio interphone can be classified into an analogy interphone that is designed by the analogy communication technique (which is also referred to a conventional interphone) and a digital interphone that is designed by the digital communication technique. The analogy interphone modulates the stored signal onto the transmission frequency of the interphone. The digital interphone digitalizes the voice signal to transmit the signal in the form of digital code, that is to say, all modulated signals transmitting on the transmission frequency of the interphone are digital.

To improve the communication range and capability of various interphones, such as a handset, a vehicle-mounted set and a fixed station, in the communication system and improve a coverage radius of the system, a conventional digital mobile radio (DMR) relay system is generally adopted. In this system, by means of a repeater transeriver, the received signal in a certain band is forwarded in other frequency by the transmitter thereof directly. The two signals of different frequencies have no influence on each other, or two customers are allowed to communicate on different frequencies respectively.

In the conventional DMR relay system, the interphone is required to transmit the signal in the predetermined power; but in some application scenes, to ensure the reliability of the communication, relatively higher transmission power needs to be provided. For example, for a DMR handset used in a market to communicate with a headquarter further away, higher transmission power is needed when the customer goes into an elevator. However, due to the action in the market, the moving distance of the handset in the market is small. Since the handset is very close to the repeater transeiver in most cases, the communication can be implemented in the lower power. In this case, the transmission with the higher power will shorten the service life of the battery, and can also increase the adjacent channel interference and generate stronger radiation.

SUMMARY OF THE INVENTION

A terminal in a digital mobile radio relay system, and a method and system for adjusting a transmission power thereof are provided according to an embodiment of the invention, for enabling the terminal to adjust the transmission power thereof adaptively, decreasing the electric energy consumption, and reducing the adjacent channel interference and the radiation.

For these purposes, following technical solutions are provided according to an embodiment of the invention.

A method for adjusting a transmission power of a terminal in a digital mobile radio relay system, includes:

receiving an idle frame transmitted by a repeater transeiver, wherein information of a transmission power of the repeater transeiver is carried in the idle frame;

obtaining the transmission power of the repeater transeiver from the information carried in the idle frame;

transmitting data in a preset transmission time slot, after entering a transmitting state;

receiving a signal from the repeater transeiver in a reverse channel and calculating a strength value of the received signal;

determining a transmission power of a next frame based on the transmission power of the repeater transeiver and the strength value of the received signal, in the case that data is to be continuously transmitted; and transmitting the next frame in a preset transmission time slot by using the determined transmission power of the next frame.

Preferably, the method further includes: activating the repeater transeiver in the case that the repeater transeiver is in a dormancy state.

Optionally, the receiving an idle frame transmitted by a repeater transeiver includes:

receiving the idle frame transmitted by the repeater transeiver in a preset transmission time slot; or receiving the idle frame transmitted by the repeater transeiver in a time slot other than the preset transmission time slot.

Preferably, the determining a transmission power of a next frame based on the transmission power of the repeater transeiver and the strength value of the received signal includes:

determining the transmission power of the next frame based on a condition, wherein the condition includes:

the strength value of the received signal being equal to a difference between the transmission power of the repeater transeiver and a transmission loss of a link from the repeater transeiver to the terminal; and the difference between the transmission power of the next frame and the transmission loss of a link from the terminal to the repeater transeiver being larger than a reception sensitivity of the repeater transeiver.

Preferably, the method further includes:

performing a fading compensation for the strength value of the received signal, before the step of determining a transmission power of a next frame based on the transmission power of the repeater transeiver and the strength value of the received signal.

Preferably, the method further includes:

determining whether the transmission power is to be adjusted, before the step of determining a transmission power of a next frame based on the transmission power of the repeater transeiver and the strength value of the received signal;

performing the step of determining a transmission power of a next frame based on the transmission power of the repeater transeiver and the strength value of the received signal, if the transmission power is to be adjusted; and transmitting a next frame in a preset transmission time slot by using a transmission power of a current frame, if the transmission power is not to be adjusted.

Optionally, the determining whether the transmission power is to be adjusted includes:

deciding that the transmission power is to be adjusted, if an impolite access is required and the idle frame transmitted by the repeater transeiver is not received before the terminal enters the transmitting state; or deciding that the transmission power is not to be adjusted, if a power dynamic adjustment function is not started by a customer.

A terminal in a digital mobile radio relay system, includes:

a first receiving unit adapted to receive an idle frame transmitted by a repeater transeiver, wherein information of a transmission power of the repeater transeiver is carried in the idle frame;

a power obtaining unit adapted to obtain the transmission power of the repeater transeiver from the information carried in the idle frame;

a transmitting unit adapted to transmit data in a preset transmission time slot after entering a transmitting state;

a second receiving unit adapted to receive a signal from the repeater transeiver in a reverse channel and calculate a strength value of the received signal; and a calculating unit adapted to determine a transmission power of a next frame based on the transmission power of the repeater transeiver and the strength value of the received signal, in the case that data is to be continuously transmitted by the transmitting unit, wherein the transmitting unit is further adapted to transmit the next frame in a preset transmission time slot by using the transmission power of the next frame determined by the calculating unit.

Preferably, the terminal further includes:

an activating unit adapted to activate the repeater transeiver in the case that the repeater transeiver is in a dormancy state.

Optionally, the first receiving unit is adapted to receive the idle frame transmitted by the repeater transeiver in the preset transmission time slot; or receiving the idle frame transmitted by the repeater transeiver in a time slot other than the preset transmission time slot.

Preferably, the calculating unit is adapted to determine the transmission power of the next frame based on a condition, wherein the condition includes:

the strength value of the received signal being equal to a difference between the transmission power of the repeater transeiver and a transmission loss of a link from the repeater transeiver to the terminal; and a difference between the transmission power of the next frame and the transmission loss of the link from the terminal to the repeater transeiver being larger than a reception sensitivity of the repeater transeiver.

Preferably, the terminal further includes:

a compensating unit adapted to perform a fading compensation for the strength value of the received signal calculated by the second receiving unit, before the transmission power of the next frame is determined by the calculating unit based on the transmission power of the repeater transeiver and the strength value of the received signal.

Preferably, the terminal further includes:

a determining unit for determining whether the transmission power is to be adjusted, before the transmitting power of the next frame is determined by the calculating unit based on the transmission power of the repeater transeiver and the strength value of the received signal, notifying the calculating unit to determine the transmission power of the next frame based on the transmission power of the repeater transeiver and the strength value of the received signal, if the transmission power is to be adjusted; and notifying the transmitting unit to transmit the next frame in a preset transmission time slot by using a transmission power of a current frame, if the transmission power is not to be adjusted.

Optionally, the second determining unit is adapted to determine whether the transmission power is to be adjusted in accordance with a rule, wherein the rule includes if an impolite access is required and the idle frame transmitted by the repeater transeiver is not received by the first receiving unit before the terminal enters the transmitting state, deciding that the transmission power is to be adjusted; or deciding that the transmission power is not to be adjusted, if a power dynamic adjustment function is not started by a customer.

A system for adjusting a transmission power of a terminal in a digital mobile radio relay system, includes a terminal and a repeater transeiver, wherein the repeater transeiver is adapted to transmit an idle frame, wherein information of a transmission power of the repeater transeiver is carried in the idle frame; and the terminal is adapted to receive the idle frame transmitted by the repeater transeiver; obtain the transmission power of the repeater transeiver from the information carried in the idle frame; transmit data in a preset transmission time slot after entering a transmitting state; receive a signal from the repeater transeiver in a reverse channel and calculate a strength value of the received signal; determine a transmission power of a next frame based on the transmission power of the repeater transeiver and the strength value of the received signal, in the case that data is to be continuously transmitted; and transmit the next frame of data in a preset transmission time slot by using the determined transmission power of the next frame.

With the terminal in the digital mobile radio relay system, and the method and system for adjusting a transmission power thereof according to the embodiment of the invention, requirements of communication in different conditions can be satisfied by different transmission power during the movement of the terminal in the conventional DMR relay system, so that the terminal can adjust the transmission power thereof adaptively, the electric energy consumption can be decreased, and the adjacent channel interference and the radiation can be reduced.

DETAILED DESCRIPTION OF THE INVENTION

Embodiments of the invention will be described in further detail in conjunction with the drawings hereinafter, so that solutions of the embodiments of the invention will be better understood by those skilled in the art.

With the terminal in the digital mobile radio relay system and the method for adjusting a transmission power thereof according to the embodiment of the invention, requirements of communication in different conditions can be satisfied by different transmission powers during the movement of the terminal in the conventional DMR relay system, so that the terminal can adjust the transmission power thereof adaptively, the electric energy consumption can be decreased, and the adjacent channel interference and the radiation can be reduced.

In the cellular communication system, the dynamic power adjustment can be implemented in two ways: one is the open loop control and the other is the closed loop control. The closed loop power control refers to the process of controlling the transmission power by the transmitting terminal based on the feedback information sent by the receiving terminal; and the open loop power control refers to the process of controlling the transmission power by the transmitting terminal based on the information measured by the transmitting terminal, rather than the feedback information sent by the receiving terminal.

The open loop power adjustment has been widely used in Global System for Mobile Communications (GSM) and Code Division Multiple Access (CDMA) network, and has relatively more technical solutions which is implemented by multiple communications through the scheduling center of the network. However, in the conventional DMR relay system, no scheduling center is provided, and the terminal is not required to access the network but only wakes up the repeater transeiver to communicate directly. Thus, the power control solutions in the cellular communication system are not applicable to the conventional application scenes, such as, no network and the instant communication, of the interphone.

Figure 1:
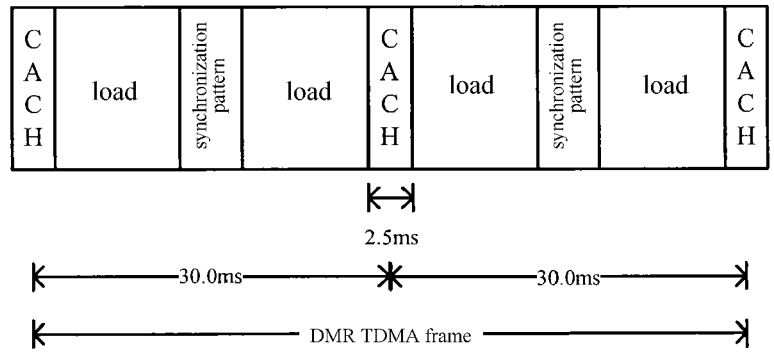
FIG. 1 is a schematic diagram of a frame structure of a downlink DMR time division multiple access in a relay mode according to an embodiment of the invention.

The DMR standard uses Time Division Multiple Access (TDMA) frame structure with double time slot, which includes two identical time slots. Each of the time slots has a length of 30 ms, a protective internal of 1.25 ms is provided on both ends of the time slots, and thus the interval between the two time slots is 2.5 ms. In the conventional DMR relay system, the double time slot structure of TDMA of the repeater transeiver is shown in FIG. 1, common assignment channel (CACH) information having a length of 2.5 ms is inserted into the protective internal of 2.5 ms between the two time slots by the repeater transeiver. The CACH information is used to indicate the time slot number and the occupant condition of the subsequent time slot, even if the receiver knows which time slot is received. During the communication, the repeater transeiver periodically transmits the CACH information. The receiver receives the CACH information to establish synchronization with the repeater transeiver, f thereby locking the preset communication time slot to transmit data in this time slot and enter a sleep state or reception state in the other time slot.

Thus, based on the characteristics of the conventional DMR relay system described above, a terminal and a method for adjusting a transmission power of the terminal are provided according to the embodiment of the invention, so that the terminal can transmit data in one time slot, and receive a signal sent by the repeater transeiver and calculate the received signal strength indication (RSSI) of the received signal in the other time slot. Thus, the transmission power of the terminal can be determined based on the received RSSI value and the power of the repeater transeiver, and the adaptive adjustment of the transmission power of the terminal is achieved.

The transmission power of the terminal is not too large, and can ensure that the RSSI value received by the repeater transeiver is not too small. That is to say, the transmission power of the terminal ensures that the RSSI value received by the repeater transeiver is larger than the sensitivity of the repeater transeiver, that is, meets a condition as follow:

$$10 \lg W_S - L_{BSI} > S_I \quad (1)$$

where $W_S$ is the transmission power of the terminal in Watt; $L_{BSI}$ is the transmission loss of a link (referred to as Inbound) from the terminal to the repeater transeiver in dBm; and $S_I$ is the reception sensitivity of the repeater transeiver in dBm.

The RSSI value received by the terminal is as follow:

$$10 \lg W_I - L_{BSO} = RSSI_{RCV} \quad (2)$$

where $RSSI_{RCV}$ is the RSSI value received by the terminal in dBm; $W_I$ is the transmission power of the repeater transeiver in dBm; and $L_{BSO}$ is the transmission loss of the link (referred to as Outbound) from the repeater transeiver to the terminal in dBm.

Formula (1)-formula (2) is:

$$10 \lg \frac{W_S}{W_I} - L_{BSI} + L_{BSO} > S_I - RSSI_{RCV} \quad (3)$$

According to radio wave theory, the transmission loss in the ideal environment is as follow:

$$L_{bs} dBm = 62.45 + 20 \lg dKM + 20 \lg fMHZ \quad (4)$$

where d is the transmission distance and f is the transmission frequency;

It is considered that the distance of the Inbound is the same as that of the Outbound or both distances of the Inbound and Outbound can be ignored. The formula (4) is substituted into the formula (3) to obtain:

$$10 \lg \frac{W_S}{W_I} - 20 \lg f_I + 20 \lg f_O > S_I - RSSI_{RCV} \quad (5)$$

The formula (5) is collated to obtain:

$$RSSI_{RCV} > S_I + 20 \lg \frac{f_I}{f_O} + 10 \lg \frac{W_I}{W_S} \quad (6)$$

In the formula (6), the frequency $f_I$ of the Inbound and the frequency $f_O$ of the Outbound are known, the reception sensitivity $S_I$ of the repeater transeiver is a fixed value that is determined from the characteristics of the device, and $RSSI_{RCV}$ is the RSSI value received by the terminal. Thus, it is necessary to know the transmission power $W_I$ of the repeater transeiver to obtain the minimum transmission power of the terminal. The different repeater transceivers have the different transmission power, and thus the minimum transmission power of the terminal can be determined according to the above formula (6) as long as the terminal obtains the transmission power of the repeater transeiver before the transmission.

Figure 2:
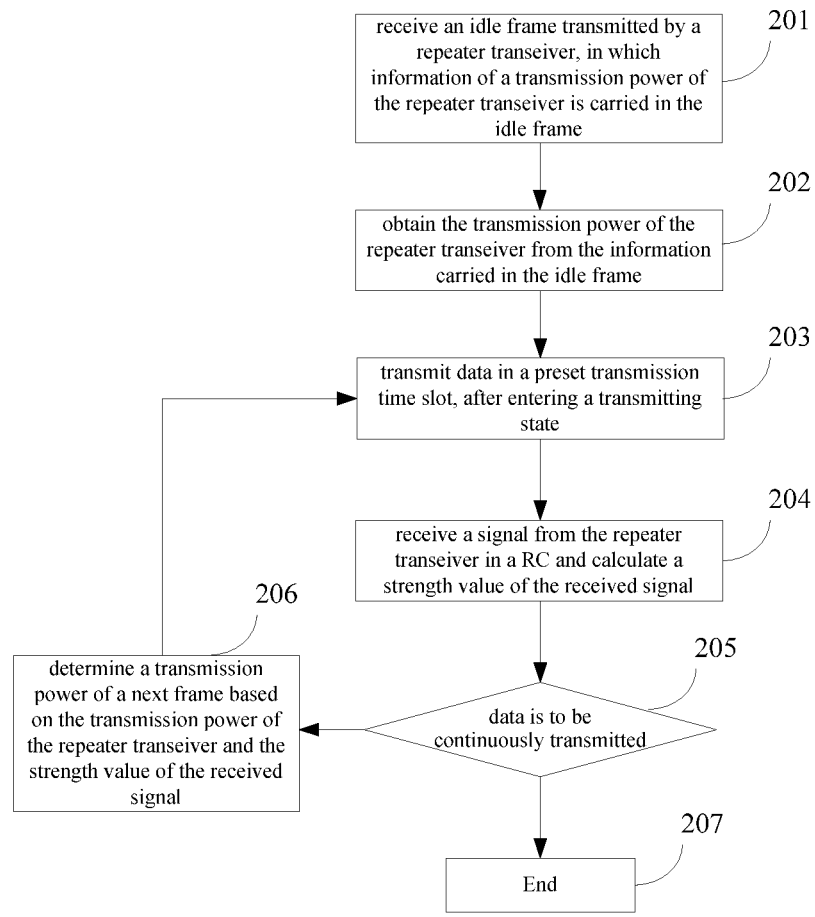
FIG. 2 is a flowchart of a method for adjusting a transmission power of a terminal in a digital mobile radio relay system according to an embodiment of the invention.

FIG. 2 shows a flowchart of a method for adjusting a transmission power of a terminal in a digital mobile radio relay system according to an embodiment of the invention. The method includes the following steps.

Step 201, receiving an idle frame transmitted by a repeater transeiver, in which information of the transmission power of the repeater transeiver is carried in the idle frame.

In the existing DMR protocol, the idle frame transmitted by the repeater transeiver is a pseudo-random code of 96 bits, which does not carry any meaningful data.

For this, the existing idle frame is expanded in the embodiment of the invention, so that the idle frame can carry the information of the transmission power of the repeater transeiver. The transmission power of the repeater transeiver can be written into the FLASH of the repeater transeiver. Thus, the transmission power of the repeater transeiver can be read from the FLASH of the repeater transeiver and filled into the idle frame. In this way, when transmitting the idle frame, the repeater transeiver can carry in the expanded idle frame the read transmission power thereof. After receiving the idle frame, the terminal can obtain the transmission power of the repeater transeiver from the information carried in the idle frame.

Figures 3, 4:
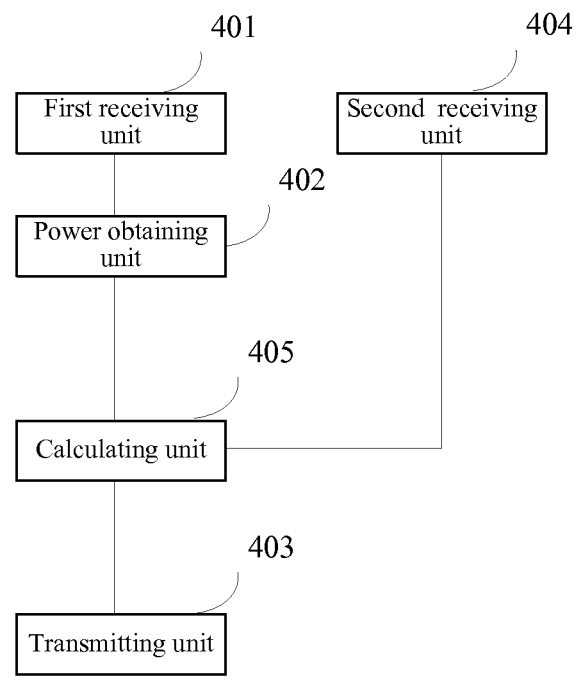
FIG. 3 is a schematic structural diagram of an expanded idle frame according to an embodiment of the invention.
FIG. 4 is a schematic structural diagram of a terminal in a digital mobile radio relay system according to an embodiment of the invention.

A format of the expanded idle frame is shown in FIG. 3, and the following information are included in the idle frame:

power value of 8 bits, 00000001b-11111111, indicating 1-256 W;

MFID of 8 bits, manufacturer function identification;

CRC of 16 bits, CRC of the power value and the MFID; and pseudo code of 64 bits, pseudo-random code.

96 bits is converted into 196 bits by performing block product turbo code (BPTC), and then a frame of data of 27.5 ms is formed by the interleaving.

Practically, in the embodiment of the invention, the format of the idle frame is not limited to the above, and can also be others, as long as the information of the transmission power of the repeater transeiver can be carried in it.

It is to be noted that the information of the transmission power of the repeater transeiver carried in the idle frame can be the transmission power of the repeater transeiver, and can also be other numerical information corresponding to the transmission power of the repeater transeiver.

Step 202, obtaining the transmission power of the repeater transeiver from the information carried in the idle frame.

Specifically, the idle frame transmitted by the repeater transeiver can be received in a preset transmission time slot or a time slot other than the preset transmission time slot, which will be described in detail in the following.

Step 203, transmitting data in a preset transmission time slot, after entering a transmitting state.

Step 204, receiving a signal from the repeater transeiver in a reverse channel (RC) and calculating a strength value of the received signal.

In the digital mobile radio relay system, the terminal adopts the double time slots TDMA frame structure, the user can set any one of the two time slots as the preset transmission time slot. During the transmission of data, the data is transmitted in the preset transmission time slot, while the reception is performed in the other time slot. The transmission and the reception are performed simultaneously, thus the process of reception in the other time slot can be referred to as the reception in the reverse channel.

Step 205, determining whether data is to be continuously transmitted; performing a step 206 if data will be continuously transmitted; and else performing a step 207.

Step 206, determining a transmission power of a next frame based on the transmission power of the repeater transeiver and the strength value of the received signal; and then performing the step 203, that is, transmitting the next frame of data in a preset transmission time slot by using the determined transmission power of the next frame.

In determining the transmission power of the next frame, the two conditions shown in the above formulas (1) and (2) must be satisfied. Specifically, the transmission power of the next frame can be calculated by the above formula (6).

Step 207, ending.

It can be seen that according to the method for adjusting a transmission power of the terminal in the digital mobile radio relay system, the transmission power of the repeater transeiver is obtained before the transmission, the signal from the repeater transeiver is received in the reverse channel and the strength value of the received signal is calculated, so that the minimum transmission power for transmitting the next frame by the terminal is determined, the adaptive adjustment of the transmission power is achieved, communication requirements of the terminal in different circumstances are satisfied, the electric energy consumption is decreased, and the adjacent channel interference and the radiation are reduced.

In the conventional DMR relay system, the repeater transeiver will not transmit any data packet in the dormancy state; and will transmit the frame synchronization data in the activate state. Thus, according to the frame synchronization data received from the repeater transeiver, the terminal can determine whether the repeater transeiver is in the dormancy state or in the activate state.

In the activate state, the repeater transeiver will transmit the idle frame in the idle time slot, and forwards the data received from the terminal in the non-idle time slot.

For this, in the embodiment of the invention, the above method can further include the following steps. The terminal starts the transmission in the common DMR relay mode. The terminal will activate the repeater transeiver at first if the repeater transeiver is in the dormancy state. Specifically, the terminal transmits control signaling block (CSBK) data, and the repeater transeiver will be activated after receiving the CSBK data. After the repeater transeiver is activated, there are two idle time slots, and the repeater transeiver will transmit the idle frame in the two time slots. The idle frame carries the transmission power of the repeater transeiver.

If the repeater transeiver is in the activate state and the transmission time slot preset by the terminal is idle, the repeater transeiver will transmit the idle frame in the preset transmission time slot. The terminal can obtain the transmission power of the repeater transeiver after receiving the idle frame.

If the repeater transeiver is in the activate state, in the case that the terminal performs a polite access, the terminal will perform the transmission after receiving the idle frame in the transmission time slot of the terminal; and in the case that the terminal performs an impolite access, the terminal will perform the transmission directly without receiving the idle frame.

If the repeater transeiver is in the activate state and the transmission time slot preset by the terminal is busy, in the case that the terminal performs the polite access, the terminal is not allowed to perform the transmission if detecting that the preset time slot is occupied; and in the case that the terminal perform the impolite access, there are two cases. In one case, the repeater transeiver is busy in both time slots, such that the repeater transeiver will not transmit the idle frame in either of the two time slots, and the terminal can not obtain the transmission power of the repeater transeiver because the terminal can not receive the idle frame. In the other case, the repeater transeiver is idle in the time slot other than the preset transmission time slot, such that the repeater transeiver will transmit the idle frame in this idle time slot, and the terminal will receive the idle frame, so as to obtain the transmission power of the repeater transeiver.

The so-called polite access refers to that the terminal transmits the data in the case that some certain conditions are satisfied, so as to avoid the interference of the transmission of data in a channel in the case that another customer is also using the same channel. The polite access has two access conditions: 1) the channel is idle: the transmission can be performed only in the case that the channel is idle; and 2) the color code is idle: the transmission can be performed only in the case that the channel is idle or the color codes do not match. The color code can identify a system, and the terminals who want to communicate with each other should be set with the same color code. The so-called impolite access refers to that the terminal can transmit data regardless of the state of the channel. In order to satisfy the application requirements of the customer, a power dynamic adjustment option function can be further provided in the embodiment of the invention. For example, this option can be implemented by a switch in hardware, or by setting a corresponding parameter in software.

Further, in the above case that the terminal performs the impolite access and the repeater transeiver is busy in both time slots, such that the terminal can not receive the idle frame and can not obtain the transmission power of the repeater transeiver, it can be remarked that the dynamical adjustment of the transmission power is not performed so as to avoid the unnecessary calculation of transmission power.

For this purpose, in the above flowchart shown in FIG. 2, the following steps can be further included:

Before the step 206 of determining a transmission power of a next frame based on the transmission power of the repeater transeiver and the strength value of the received signal determining whether the transmission power is to be adjusted; performing the step 206 if the transmission power is to be adjusted; transmitting a next frame in a preset transmission time slot by using the transmission power of a current frame, if the transmission power is not be adjusted.

The step of determining whether the transmission power is to be adjusted includes:

deciding that the transmission power is to be adjusted, if an impolite access is required and the idle frame transmitted by the repeater transeiver is not received before the terminal enters the transmitting state; or deciding that the transmission power is not to be adjusted, if a power dynamic adjustment function is not started by a customer.

That is to say, if the power dynamic adjustment option function is provided and the impolite access of the customer is permitted, both of the following two conditions should be satisfied:

(1) the power dynamic adjustment function is enabled by the customer; and (2) the terminal obtains the transmission power of the repeater transeiver when transmitting data.

It is to be noted that in the embodiment of the invention, the minimum transmission power of the terminal can be calculated from the above formula (6). In the conventional DMR relay system, no dispatcher station is provided and it is unnecessary to access into the network, but the repeater transeiver is waken up to communicate directly. This characteristic means that the power dynamic adjustment can only be implemented by the open loop power control. However, the terminal moves continuously, the open loop power adjustment must be performed in real time. In this way, the influence of the variation in the path loss due to the movement of the terminal can be eliminated, which variation is not detected in real time.

For this, in the specific implementation of the embodiment of the invention, the transmission power of the terminal can be adjusted periodically, such as per 30 ms, based on the transmission characteristics of the repeater transeiver.

Specifically, according to the characteristic of transmission of the repeater transeiver in two time slots, the terminal can transmit data in one time slot and receive the signal from the repeater transeiver in the other time slot, so as to calculate the RSSI value of the signal, thus the influence of the movement of the terminal on the position thereof is very slight in such short time by using the real-time adjustment per 30 ms. For example, when the terminal is provided on a car with a speed of 80 km/h, the car moves only 0.6 m in the 30 ms.

Practically, the compensation process can be further performed in the embodiment of the invention, so as to further eliminate the influence caused by the movement of the terminal.

The above formula (6) is a formula deduced in the ideal transmission circumstance. In the real circumstance, the radio wave will be reflected, refracted or scattered, the transmission is more complicated, and there exist the fast fading due to the multipath effect and the slow fading due to the shadow effect, thus it is necessary to perform the compensation and the corresponding process.

In the practical application circumstance, the loss of the radio wave is as follow:

$$p(d) = |\overline{d}|^{-n} \times S(\overline{d}) \times R(\overline{d}) \quad (7)$$

where $|\overline{d}|$ is the distance between the repeater transeiver and the terminal.

The above formula is the universal formula for calculating the loss of the transmission signal, and is indicated by the following three factors:

(1) the transmission loss in the free space, which is indicated by $|\overline{d}|^{-n}$, where n ranges from 3 to 4 generally;

(2) shadow fading, which is indicated by $S(\overline{d})$, and the shadow fading of the radio wave transmission presents as the slow fading due to the topography, building or other barriers; and (3) multipath fading, which is indicated by $R(\overline{d})$, and the multipath fading of the radio wave transmission presents as the fast fading, which is a major characteristic of the radio wave transmission.

The received RSSI value exhibits the following distribution:

(1) the received RSSI value is changed quickly in a period of a dozen wavelengths, which is referred to as the fast fading;

(2) the received RSSI value is changed in a period of hundreds of wavelengths slowly, which is referred to as the slow fading; and (3) the received RSSI value will presents as d in a very long period.

In a period of a dozen wavelengths, the received RSSI value represents the character of the fast fading. For avoiding the fast variation in the calculated RSSI value due to the fast fading, the average RSSI value in a period of hundreds of wavelengths can be calculated, so that the received RSSI value represents the character of the slow fading. The RC channel of the terminal has the reception time of 10 ms, and performs the calculation per 2.5 ms. For example, in the case of the interphone with the communication frequency of 100 MHz, there are more than 2500 wavelengths in the 2.5 ms, so that the influence due to the fast fading can be avoided.

Therefore, in the embodiment of the invention, to avoid the influence of a negative fading (generally, 15 to 20 dBm) of the fast fading, a safe capacity Y of the fast fading can be set, for example, Y=20 dBm. Furthermore, a safe capacity Z of the slow fading can also be set, for example, Z=5 dBm in the case that the period of the power dynamic adjustment is 30 ms.

The above formula (6) is:

$$RSSI_{RCV} > S_I + 201 \; g\frac{f_I}{f_O} + 101 \; g\frac{W_I}{W_S}.$$

$$S_I + 201 \; g\frac{f_I}{f_O}$$

in the above formula (6) is indicated by X, and $$101 \; g\frac{W_I}{W_S}$$

is indicated by K. In addition, two safe capacities are added to avoid the influence of the fast fading and the slow fading, and thus the formula (6) turns to be:

$$RSSI_{RCV} > X+Y+Z+K \quad (8)$$

In practice, to simplify the calculation and reduce the workload of the calculation, the transmission power of the terminal can be classified into several levels, such as 5 levels incrementally. Due to $$K = 101 \; g\frac{W_I}{W_S},$$

correspondingly, K1>K2>K3>K4>K5.

For example, the transmission power of the DMR handset can be classified into 1 W, 2 W, 3 W, 4 W and the maximum power. When $RSSI_{RCV} > X+Y+Z+K1$, the terminal can adjust the transmission power to the lowest power. When $RSSI_{RCV} < X+Y+Z+K5$, the terminal can adjust the transmission power to the highest power. When $X+Y+Z+K2 < RSSI_{RCV} < X+Y+Z+K1$, the terminal can adjust the transmission power to the power corresponding to K2.

Furthermore, the above is only the simplified process manner of the embodiment of the invention used in the specific application, and the parameters and processes necessary for dynamically adjusting the transmission power can be determined by the specific situation of the device. For example, reference can be made to the followings.

1. The maximum and the minimum powers of the terminal can be configured by the customer programming software (CPS). The power controlling mechanism can be adjusted restrictedly within this range. Instead of the above division of 5 levels, more accurate adjustment (such as 2 dBm) can be supported, which can be determined by the to characteristics of the product itself.

2. For different products, the above parameters X, Y and Z can be different.

3. Whether the power is to be adjusted dynamically can be determined by the customer.

Assuming that in the conventional DMR relay system, the terminal has the maximum power of 4.4 W and the minimum power of 1 W, in the case that the power is adjusted dynamically using the method according to the embodiment of the invention, the power in transmission can be saved by: ((1449×0.5+80×0.5)−(720×0.5+100×0.5))/(1449×0.5+80×0.5) =46.3%.

According to the energy saving formula of transmission: reception: standby=5:5:90, assuming that the terminal that previously transmits data in the power of 4.4 W all the time, and transmits data in the power of 1 W in a haft of the time and in the power of 4.4 W in another half of the time after the power dynamic adjustment, the service life of the battery can be improved by 0.72 hour. The above value is calculated in the case of the transmission time of 5%. The longer the transmission time, the more significant the energy saving effect.

It can be understood by those skilled in the art that all or a part of the steps in the method in the above embodiment can be implemented by instructing the related hardware using the program, and the program can be stored in a computer readable storage medium, such as ROM/RAM, magnetic disk, or optical disk.

Correspondingly, a terminal in a digital mobile radio relay system is further provided according to an embodiment of the invention, as shown in FIG. 4, which is a schematic structural diagram of the terminal.

In this embodiment, the terminal includes: a first receiving unit 401, a power obtaining unit 402, a transmitting unit 403, a second receiving unit 404 and a calculating unit 405.

The first receiving unit 401 is adapted to receive an idle frame transmitted by a repeater transeiver, in which information of a transmission power of the repeater transeiver is carried in the idle frame It is to be noted that the first receiving unit 401 can be adapted for receiving an idle frame transmitted by a repeater transeiver in a preset transmission time slot; or receiving an idle frame transmitted by a repeater transeiver in a time slot other than the preset transmission time slot. The information of the transmission power of the repeater transeiver carried in the idle frame can be the transmission power of the repeater transeiver, and can also be other numerical information corresponding to the transmission power of the repeater transeiver. The format of the idle can refer to the above description, which will not be described in detail here.

The power obtaining unit 402 is adapted to obtain the transmission power of the repeater transeiver from the information carried in the idle frame.

The transmitting unit 403 is adapted to transmit data in a preset transmission time slot after entering a transmitting state.

The second receiving unit 404 is adapted to receive a signal from the repeater transeiver in a reverse channel and calculate a strength value of the received signal.

The calculating unit 405 is adapted to determine a transmission power of a next frame based on the transmission power of the repeater transeiver and the strength value of the received signal, in the case that the data is to be transmitted by the transmitting unit 403 continuously. Specifically, the transmission power of the next frame can be determined according to the two conditions shown by the above formulas (1) and (2), i.e., the transmission power of the next frame can be determined by the formula (6).

In this embodiment, the transmitting unit 403 is further adapted to transmit the next frame of data in a preset transmission time slot by using the transmission power of the next frame determined by the calculating unit 405.

In the terminal in the digital mobile radio relay system provided according to the embodiment of the invention, the transmission power of the repeater transeiver is obtained before the transmission, the signal sent from the repeater transeiver is received in the RC, and the strength value of the received signal is calculated, such that the minimum transmission power for transmitting the next frame by the terminal is determined, the adaptive adjustment of the transmission power is achieved, communication requirements of the terminal in different circumstances is satisfied, the electric energy consumption is decreased, and the adjacent channel interference and the radiation are reduced.

Before the terminal enters the transmitting state, the repeater transeiver may be in a dormancy state. For this, the terminal according to the embodiment of the invention can further includes:

an activating unit adapted to activate the repeater transeiver in the case that the repeater transeiver is in a dormancy state.

Figure 5:
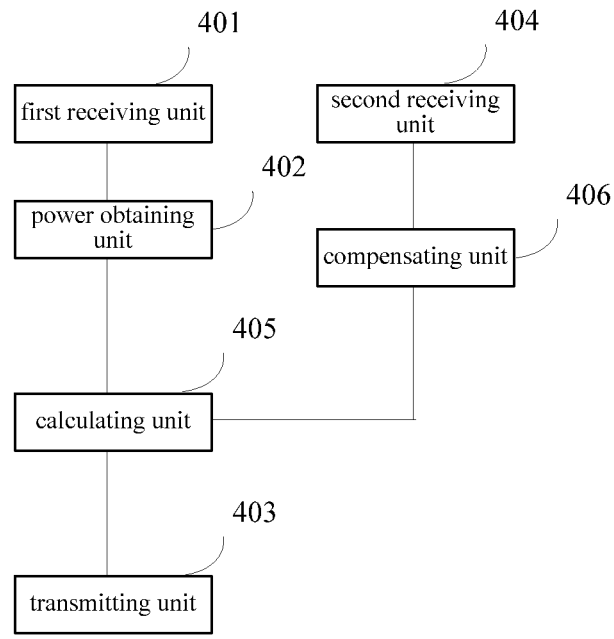
FIG. 5 is another schematic structural diagram of a terminal in a digital mobile radio relay system according to an embodiment of the invention.

As mentioned above, the calculating unit 405 can calculate the transmission power of the next frame by the formula (6). In order to avoid the influence of the RSSI fast fading and slow fading, as shown in FIG. 5, the terminal according to the embodiment of the invention can further includes:

a compensating unit 406 adapted to perform a fading compensation for the strength value of the received signal calculated by the second receiving unit 404, before the transmission power of the next frame is determined by the calculating unit 405 based on the transmission power of the repeater transeiver and the strength value of the received signal; and transmit the compensated strength value of the received signal to the calculating unit 405, so that the calculating unit 405 can determine the transmission power of the next frame based on the compensated strength value of the received signal.

Figure 6:
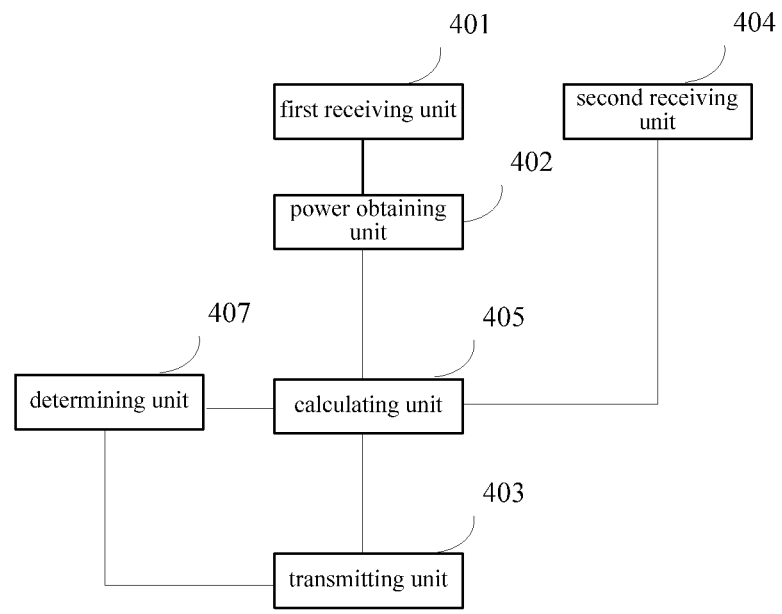
FIG. 6 is yet another schematic structural diagram of a terminal in a digital mobile radio relay system according to an embodiment of the invention.

FIG. 6 shows yet another schematic structural of a terminal in a digital mobile radio relay system according to an embodiment of the invention.

As compared with the embodiment shown in FIG. 4, the terminal in this embodiment further includes:

a determining unit 407 adapted to determine whether the transmission power is to be adjusted, before the transmission power of the next frame is determined by the calculating unit 405 based on the transmission power of the repeater transeiver and the strength value $RSSI_{RCV}$ of the received signal, notify the calculating unit 405 to determine the transmission power of the next frame based on the transmission power of the repeater transeiver and the strength value of the received signal, if the transmission power is to be adjusted; and notify the transmitting unit 403 to transmit the next frame in a preset transmission time slot by using the transmission power of a current frame, if the transmission power is not to be adjusted.

Specifically, the determining unit 407 is adapted to determine whether the transmission power is to be adjusted in accordance with a rule as follow:

if an impolite access is required and the idle frame transmitted by the repeater transeiver is not received by the first receiving unit before the terminal enters the transmitting state, deciding that transmission power is to be adjusted; or deciding that the transmission power is to be adjusted, if a power dynamic adjustment function is not started by a customer.

With the terminal according to the embodiment of the invention, the application requirements of the customer can be satisfied better. For example, the power dynamic adjustment option function can be provided, which can be implemented for example by switch in the hardware, or by setting a corresponding parameter in the software. Further, in the above case that the terminal performs the impolite access and the repeater transeiver is busy in both time slots, such that the terminal can not receive the idle frame and can not obtain the transmission power of the repeater transeiver, it can be remarked that the dynamical adjustment of the transmission power is not performed, so as to avoid the unnecessary calculation and adjustment of transmission power.

With the terminal according to the embodiment of the invention, the adaptive adjustment on the transmission power can be achieved, and the electric energy consumption can be decreased. For example, since the moving distance of the handset is short in a market and the handset is very close to the repeater transeiver in most cases, the communication can be performed by using a low power; if the customer adjust the transmission power of the handset to the lower power, the accuracy of the communication can not be ensured sometimes. For example, the accuracy of the communication can not be ensured when the customer goes into an elevator. If the power dynamic adjustment is not applied, the communication will generally be performed by using the higher transmission power; if the power dynamic adjustment is applied, the communication will generally be performed by using the lower transmission power, so that the service life of the battery is improved significantly and the adjacent channel interference and radiation can be reduced.

Correspondingly, a system for adjusting a transmission power of a terminal in a digital mobile radio relay system is further provided according to an embodiment of the invention, and the system includes a terminal and a repeater transeiver.

The repeater transeiver is adapted to transmit an idle frame, in which information of the transmission power of the repeater transeiver is carried.

The terminal is adapted to receive the idle frame transmitted by the repeater transeiver; obtain the transmission power of the repeater transeiver from the information carried in the idle frame; transmit data in a preset transmission time slot after entering a transmitting state; receive a signal from the repeater transeiver in a reverse channel and calculate a strength value of the received signal; determine a transmission power of a next frame based on the transmission power of the repeater transeiver and the strength value of the received signal, in the case that data is to be continuously transmitted; and transmit the next frame of data in a preset transmission time slot by using the determined transmission power of the next frame.

The specific structure of the terminal can refer to the above embodiments, which will not be described in detail here.

The disclosed above are only preferred embodiments of the invention, but not meant to limit the invention, and any variations made by those skilled in the art without inventive efforts and several modifications and alternations made by those skilled in the art without deviating from the principle of the invention will fall within the scope of protection of the invention.

The invention claimed is:

1. A method for adjusting a transmission power of a terminal in a digital mobile radio relay system, comprising:
receiving an idle frame transmitted by a repeater transceiver, wherein information of a transmission power of the repeater transceiver is carried in the idle frame;
obtaining the transmission power of the repeater transceiver from the information carried in the idle frame;
transmitting data in a preset transmission time slot, after entering a transmitting state;
receiving a signal from the repeater transceiver in a reverse channel and calculating a strength value of the received signal;
determining a transmission power of a next frame based on the transmission power of the repeater transceiver and the strength value of the received signal, in the case that data is to be continuously transmitted; and transmitting the next frame in a preset transmission time slot by using the determined transmission power of the next frame.

2. The method according to claim 1, further comprising: activating the repeater transceiver in the case that the repeater transceiver is in a dormancy state.

3. The method according to claim 1, wherein the receiving an idle frame transmitted by a repeater transceiver comprises: receiving the idle frame transmitted by the repeater transceiver in a preset transmission time slot; or
receiving the idle frame transmitted by the repeater transceiver in a time slot other than the preset transmission time slot.

4. The method according to claim 1, wherein the determining a transmission power of a next frame based on the transmission power of the repeater transceiver and the strength value of the received signal comprises:
determining the transmission power of the next frame based on a condition, wherein the condition comprises:
the strength value of the received signal being equal to a difference between the transmission power of the repeater transceiver and a transmission loss of a link from the repeater transceiver to the terminal; and
the difference between the transmission power of the next frame and the transmission loss of a link from the terminal to the repeater transceiver being larger than a reception sensitivity of the repeater transceiver.

5. The method according to claim 4, further comprising:
performing a fading compensation for the strength value of the received signal, before the step of determining a transmission power of a next frame based on the transmission power of the repeater transceiver and the strength value of the received signal.

6. The method according to claim 1, further comprising:
determining whether the transmission power is to be adjusted, before the step of determining a transmission power of a next frame based on the transmission power of the repeater transceiver and the strength value of the received signal;
performing the step of determining a transmission power of a next frame based on the transmission power of the repeater transceiver and the strength value of the received signal, if the transmission power is to be adjusted; and
transmitting a next frame in a preset transmission time slot by using a transmission power of a current frame, if the transmission power is not to be adjusted.

7. The method according to claim 6, wherein the determining whether the transmission power is to be adjusted comprises:
deciding that the transmission power is to be adjusted, if an impolite access is required and the idle frame transmitted by the repeater transceiver is not received before the terminal enters the transmitting state; or
deciding that the transmission power is not to be adjusted, if a power dynamic adjustment function is not started by a customer.

8. A terminal in a digital mobile radio relay system, comprising:
a first receiving unit adapted to receive an idle frame transmitted by a repeater transceiver, wherein information of a transmission power of the repeater transceiver is carried in the idle frame;
a power obtaining unit adapted to obtain the transmission power of the repeater transceiver from the information carried in the idle frame;
a transmitting unit adapted to transmit data in a preset transmission time slot after entering a transmitting state is entered;
a second receiving unit adapted to receive a signal from the repeater transceiver in a reverse channel and calculate a strength value of the received signal; and
a calculating unit adapted to determine a transmission power of a next frame based on the transmission power of the repeater transceiver and the strength value of the received signal, in the case that data is to be continuously transmitted by the transmitting unit,
wherein the transmitting unit is further adapted to transmit the next frame in a preset transmission time slot by using the transmission power of the next frame determined by the calculating unit.

9. The terminal according to claim 8, further comprising:
an activating unit adapted to activate the repeater transceiver in the case that the repeater transceiver is in a dormancy state.

10. The terminal according to claim 8, wherein
the first receiving unit is adapted to receive the idle frame transmitted by the repeater transceiver in the preset transmission time slot; or receiving the idle frame transmitted by the repeater transceiver in a time slot other than the preset transmission time slot.

11. The terminal according to claim 8, wherein
the calculating unit is adapted to determine the transmission power of the next frame based on a condition, wherein the condition comprises:
the strength value of the received signal being equal to a difference between the transmission power of the repeater transceiver and a transmission loss of a link from the repeater transceiver to the terminal; and
a difference between the transmission power of the next frame and the transmission loss of a link from the terminal to the repeater transceiver being larger than a reception sensitivity of the repeater transceiver.

12. The terminal according to claim 11, further comprising:
a compensating unit adapted to perform a fading compensation for the strength value of the received signal calculated by the second receiving unit, before the transmission power of the next frame is determined by the calculating unit based on the transmission power of the repeater transceiver and the strength value of the received signal.

13. The terminal according to claim 8, further comprising:
a determining unit adapted to determine whether the transmission power is to be adjusted, before the transmission power of the next frame is determined by the calculating unit based on the transmission power of the repeater transceiver and the strength value of the received signal; notify the calculating unit to determine the transmission power of the next frame based on the transmission power of the repeater transceiver and the strength value of the received signal, if the transmission power is to be adjusted; and notify the transmitting unit to transmit the next frame in a preset transmission time slot by using a transmission power of a current frame, if the transmission power is not to be adjusted.

14. The terminal according to claim 13, wherein the determining unit is adapted to determine whether the transmission power is to be adjusted in accordance with a rule, wherein the rule comprises:
if an impolite access is required and the idle frame transmitted by the repeater transceiver is not received by the first receiving unit before the terminal enters the transmitting state, deciding that the transmission power is to be adjusted; or deciding that the transmission power is not to be adjusted, if a power dynamic adjustment function is not started by a customer.

15. A system for adjusting a transmission power of a terminal in a digital mobile radio relay system, comprising a terminal and a repeater transceiver, wherein the repeater transceiver is adapted to transmit an idle frame, wherein information of a transmission power of the repeater transceiver is carried in the idle frame; and the terminal is adapted to receive the idle frame transmitted by the repeater transceiver; obtain the transmission power of the repeater transceiver from the information carried in the idle frame; transmit data in a preset transmission time slot after entering a transmitting state; receive a signal from the repeater transceiver in a reverse channel and calculate a strength value of the received signal; determine a transmission power of a next frame based on the transmission power of the repeater transceiver and the strength value of the received signal, in the case that data is to be continuously transmitted; and transmit the next frame of data in a preset transmission time slot by using the determined transmission power of the next frame.

* * * * *